(12) United States Patent
Yakovlev

(10) Patent No.: US 8,560,805 B1
(45) Date of Patent: Oct. 15, 2013

(54) EFFICIENT ALLOCATION OF ADDRESS SPACE RESOURCES TO BUS DEVICES

(75) Inventor: Sergiy B. Yakovlev, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 196 days.

(21) Appl. No.: 12/887,018

(22) Filed: Sep. 21, 2010

(51) Int. Cl.
*G06F 12/00* (2006.01)
*G06F 13/00* (2006.01)

(52) U.S. Cl.
USPC .... 711/202; 711/100; 711/154; 711/E12.002; 711/E12.005

(58) Field of Classification Search
USPC ........... 711/100, 154, 200, E12.002, E12.005
See application file for complete search history.

(56) References Cited

U.S. PATENT DOCUMENTS

| | | | |
|---|---|---|---|
| 6,396,816 B1 * | 5/2002 | Astle et al. | 370/264 |
| 7,478,176 B2 | 1/2009 | Zimmer et al. | |
| 2004/0054839 A1 * | 3/2004 | Lee et al. | 710/306 |

OTHER PUBLICATIONS

Rusling, David, The Linux Kernel [online][retrieved on Sep. 21, 2010] Retrieved from the Internet: URL: http://tldp.org/LDP/tlk.html, Chapter 6, pp. 1-17.

\* cited by examiner

*Primary Examiner* — Midys Rojas
(74) *Attorney, Agent, or Firm* — Hope Baldauff, LLC

(57) ABSTRACT

Memory address resources requests are collected from devices on a bus. The requests are then sorted into descending order. For each resource request, a determination is then made as to whether the request is for a device that is behind a bridge. If the request is not for a device behind a bridge, the request is allocated. The request is also allocated if the request is for a device behind a bridge device and the request can be allocated without allocating padding. If a request is for a device behind a bridge and the request cannot be satisfied without using padding, then sufficient padding is allocated to properly align the request. An amount of padding may be allocated that satisfies the alignment requirement of the next resource request to be allocated. Requests for devices on the primary interface of the bridge device may also be satisfied from within the padding.

20 Claims, 9 Drawing Sheets

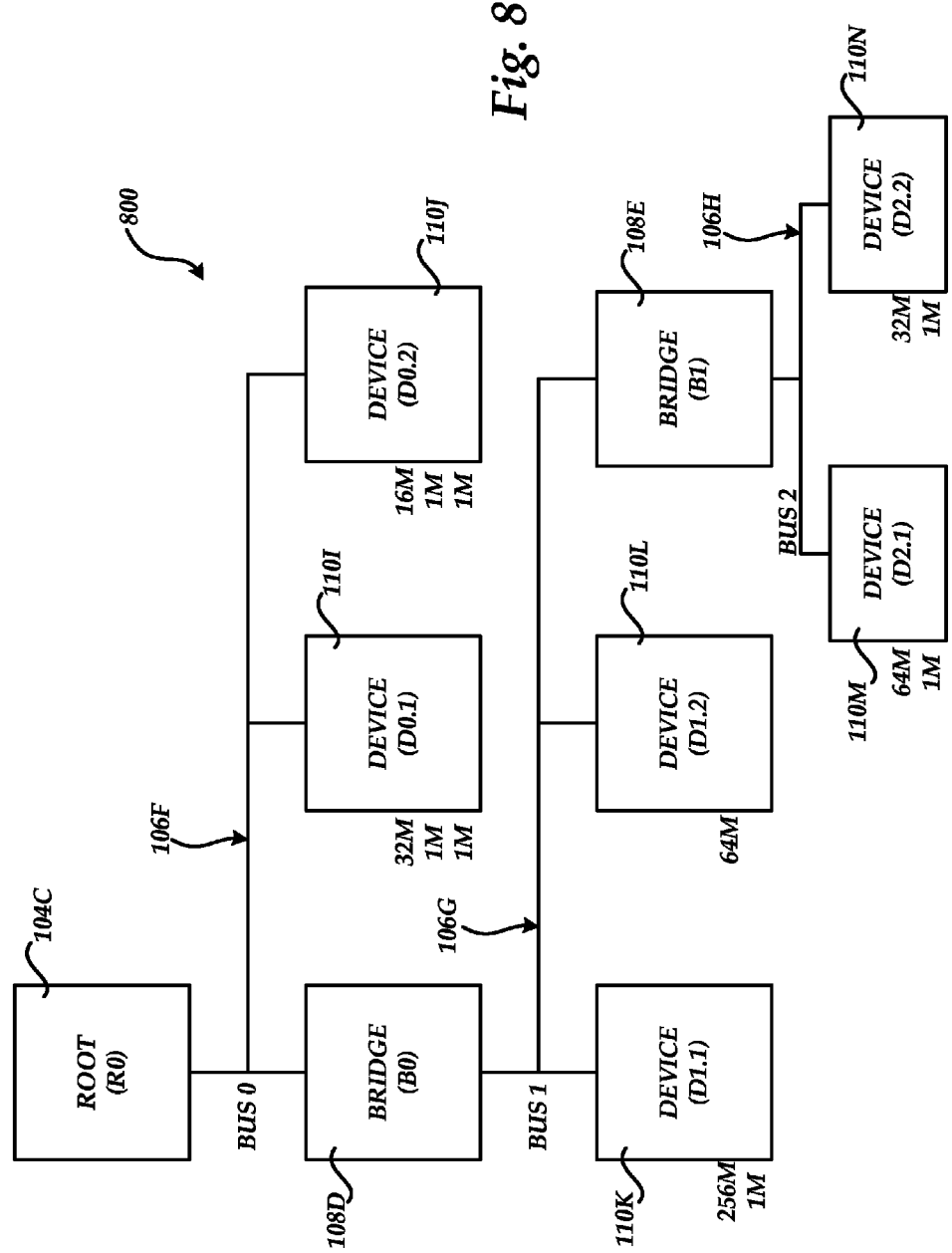

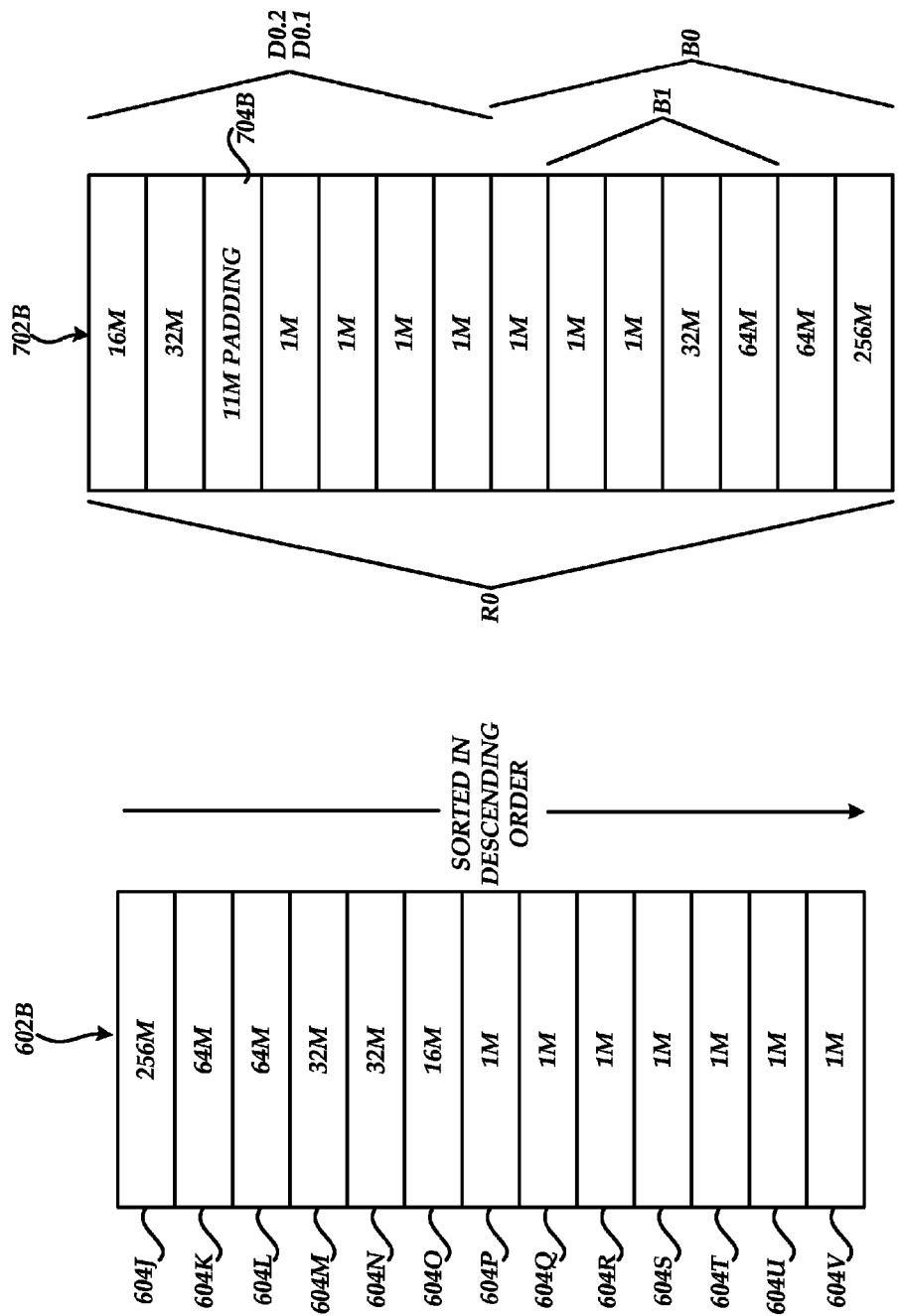

EFFICIENT ALLOCATION OF ADDRESS SPACE RESOURCES TO BUS DEVICES

BACKGROUND

When initializing a computer system bus, it is typically necessary to allocate memory address resources to devices present on the bus. For instance, the Peripheral Component Interconnect ("PCI") bus standard defines two types of memory address resources that must be allocated to each bus device upon initialization: the PCI input/output ("I/O") address space and the PCI memory address space. The PCI I/O address space may be utilized, for instance, to map the internal registers of the bus device into the address space of the host computer. The PCI memory address space is typically utilized to map memory resources utilized by a PCI device. For instance, PCI video cards typically utilize relatively large amounts of the PCI memory address space for storing video information. In the PCI bus standard each device also has a configuration memory address space utilized for configuring the device.

Allocating memory address resources to a bus with only root bus devices in an efficient manner is a relatively straightforward task. Each bus device makes requests for PCI I/O and PCI memory address resources that are powers of two. The requested values are also alignment requirements for the bus device's address decoder. Since all of the resource requests are powers of two, the resource requests are naturally aligned and can therefore be allocated without the need to pad the resource requests with unused memory addresses to align the resource requests.

When one or more bridge devices are present on a bus (PCI-to-PCI bridges, for instance), however, the task of allocating memory address resources to the devices on the bus in an efficient manner becomes much more complex. This is primarily because bridges typically have only one set of registers for storing the address range to be decoded, and therefore memory address resource requests for all of the bus devices on the secondary interface of a bridge must be grouped and allocated as a single continuous memory region. The memory address resource requirements for a bridge may, therefore, not be a power of two. As a result, it can be extremely difficult to efficiently allocate memory address resources when one or more bridges are present on a bus. Previous mechanisms for allocating memory address resources typically insert "padding" in the form of unused memory addresses in order to properly align the resource requests. The inefficient insertion of padding by previous solutions, however, often results in a significant loss of already scarce memory address resources.

It is with respect to these and other considerations that the disclosure presented herein has been made.

SUMMARY

Technologies are provided herein for the efficient allocation of memory address resources to bus devices. In particular, through an implementation of the concepts and technologies presented herein, the amount of padding required when allocating memory address resources to bus devices can be reduced compared to some previous solutions. As a result, the amount of memory address resources wasted during the configuration of bus devices can be reduced.

According to one aspect presented herein, memory address resources, such as PCI memory address space and PCI I/O address space, are allocated by first collecting the memory address resource requests (which may be referred to herein as "resource requests") from the devices on a bus. Once the resource requests have been collected, the resource requests are sorted into descending order. In one implementation, the resource requests are sorted into descending order according to an address resource request size (i.e. the amount of address space required) and an alignment requirement (i.e. how the address space is to be aligned) associated with each resource request.

Once the resource requests have been sorted into descending order, the resource requests are satisfied using the sorted resource requests. In particular, in one embodiment, the sorted resource requests are taken in descending order (i.e. largest resource request first). According to an embodiment, a sort key may be generated for each resource request by generating a 128 bit number by taking the resource size for the request and performing an OR operation with the resource alignment requirement upon which a 64 bit shift left operation ("SHL") has been performed. The sort key may be utilized to perform the sort into descending order.

For each resource request, a determination is made as to whether the resource request is for a device that is behind a bridge device (i.e. connected to the bridge's secondary interface). If the resource request is not for a device behind a bridge device, the resource request is allocated. The resource request is also allocated if the resource request is for a device behind a bridge device and the resource request can be allocated without allocating padding (i.e. the alignment requirement associated with the next resource request can be satisfied without inserting padding). Padding is unused memory addresses.

If a resource request is for a device behind a bridge device and the request cannot be satisfied without using padding, then sufficient padding is allocated to properly align the resource request. For instance, in one embodiment, an amount of padding is allocated that is necessary to properly satisfy the alignment requirement for the next resource request to be allocated. In this manner, the amount of padding necessary can be reduced as compared to previous solutions. According to another aspect, the amount of padding required is further reduced by satisfying the resource requests for devices on the primary interface of the bridge device from within the padding. This further reduces the amount of padding necessary as compared to previous solutions.

It should be appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a bus diagram showing another illustrative bus and the memory address resource requirements for each device on the bus in one illustrative example presented herein;

FIG. 9 is a data structure diagram showing a sorted list of memory address resource requirements for the devices illustrated in FIG. 8;

FIG. 10 is a memory map diagram showing an assignment of memory address resources to the devices illustrated in FIG. 8 utilizing one mechanism presented herein for efficiently allocating memory address resources.

DETAILED DESCRIPTION

The following detailed description is directed to technologies for efficiently allocating address space resource requests to bus devices. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
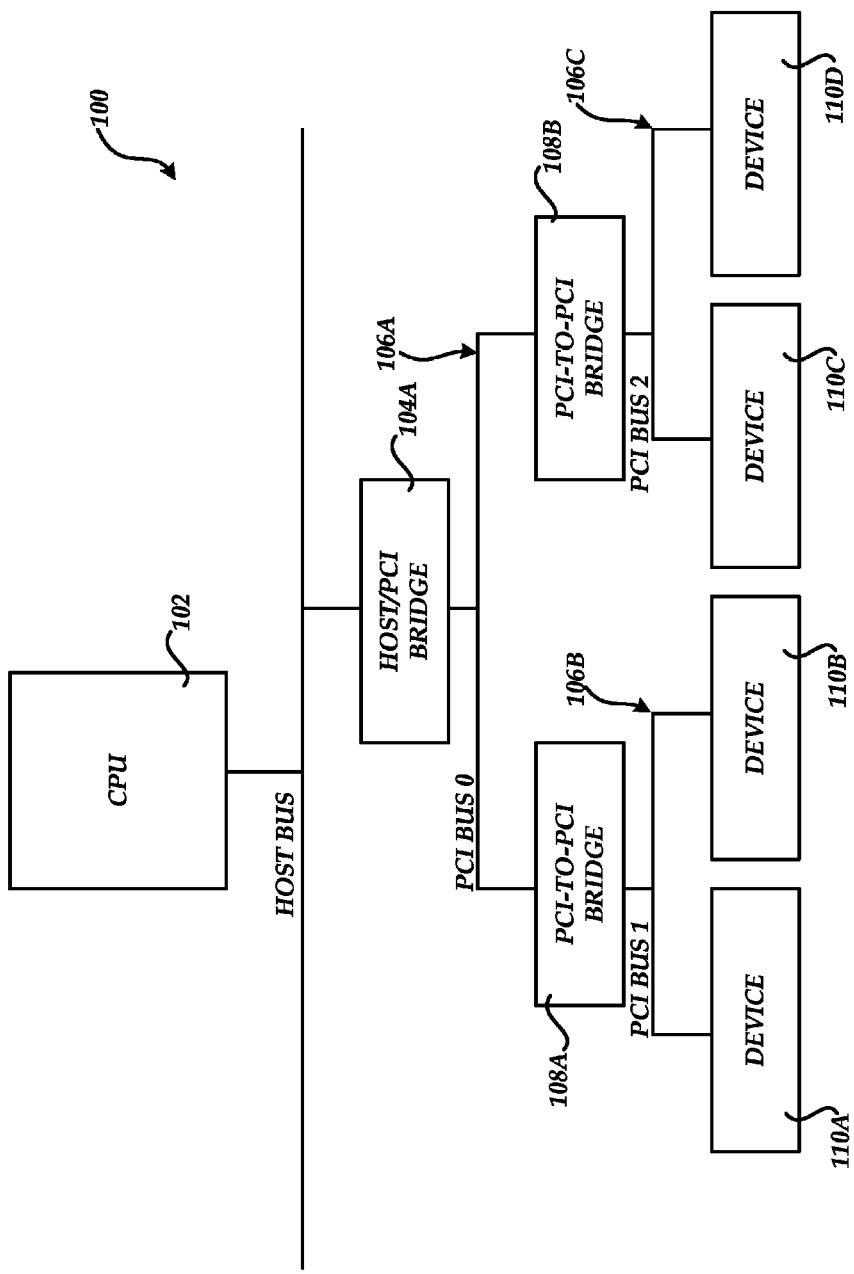
FIG. 1 is a bus diagram showing aspects of the configuration of a computer system bus that forms an operating environment for embodiments presented herein.

FIG. 1 is a bus diagram showing aspects of a computer system that forms an operating environment 100 for embodiments presented herein. In particular, the environment 100 shown in FIG. 1 illustrates a simplified view of a computer system having a central processing unit ("CPU") 102. The CPU 102 is a central processor that performs arithmetic and logical operations necessary for the operation of the computer. The computer may include a multitude of CPUs 102 and each CPU 102 might include multiple processing cores.

The CPU 102 is, in turn, connected to one or more buses that together form a hierarchy of buses. The first bus in the hierarchy is the host bus, the next bus in the hierarchy is the bus 106A (PCI bus 0), followed by the bus 106B (PCI bus 1), and the bus 106C (PCI bus 2). The buses 106A-106C may be referred to herein collectively as the buses 106 or individually as a bus 106. Buses at a lower level in the hierarchy may be referred to as subordinate buses to buses at a higher level in the hierarchy. It should be appreciated that the embodiments disclosed herein may be utilized with more or fewer buses 106 than shown in FIG. 1.

As illustrated in FIG. 1, the various buses are interconnected through the use of the bridges 104A and 108A-108B. The bridge 104A shown in FIG. 1 is a HOST-to-PCI bridge that enables communication between the host bus and the bus 106A. The bridge 108A is a PCI-to-PCI bridge 108A that enables communication between the bus 106A and the bus 106B. The bridge 108B is a PCI-to-PCI bridge 108B that enables communication between the bus 106A and the bus 106C.

As also shown in FIG. 1, the buses may each support one or more devices. For instance, the bus 106B includes the devices 110A and 110B while the bus 106C includes the devices 110C and 110D. The devices may comprise cards configured for use with a PCI bus, such as a video card, a sound card, a network card, or a suitably configured card for providing another type of functionality. It should be appreciated that more or fewer devices 110 may be utilized than illustrated in FIG. 1.

It should be appreciated that the bus architecture shown in FIG. 1 and described above has been simplified and that additional hardware components not shown in FIG. 1 may be necessary to implement the bus architecture. It should also be appreciated that while the embodiments presented herein have been disclosed in the context of a PCI bus system, the embodiments presented herein may be utilized with other types of bus architectures and implementations.

Figure 2:
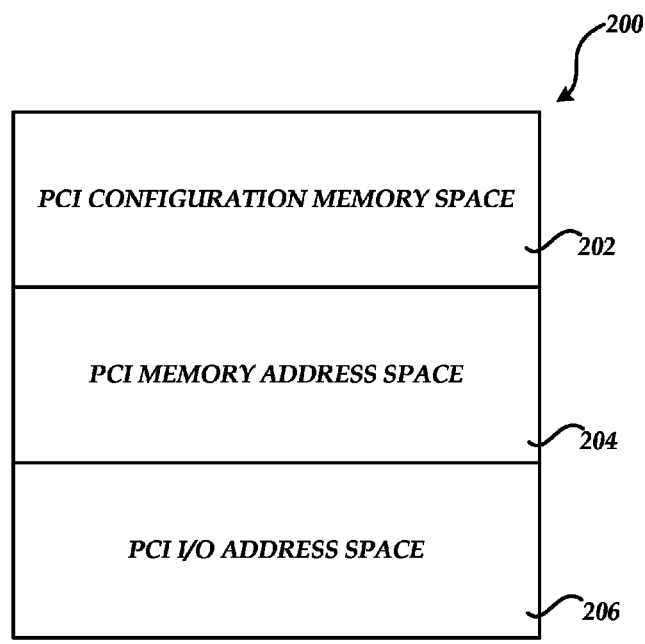
FIG. 2 is a memory diagram that shows aspects of several address spaces that are utilized or allocated during bus configuration in one embodiment presented herein.

FIG. 2 is a memory diagram that shows aspects of several address spaces that are utilized or allocated during bus configuration in one embodiment presented herein. As discussed briefly above, the PCI bus standard defines two types of memory address resources that must be allocated to each bus device upon initialization: the PCI I/O address space 206 and the PCI memory address space 204 (which may be referred to herein collectively as "memory address resources"). The PCI I/O address space 206 may be utilized, for instance, to map the internal registers of a bus device into the address space of a host computer. The PCI memory address space 204 (which might also be referred to therein as Memory Mapped I/O ("MMIO")) is typically utilized to map memory resources and I/O registers utilized by a bus device. For instance, PCI video cards typically utilize relatively large amounts of the PCI memory address space 204 for storing video information. In a PCI system, each device might also have a configuration memory address space 202 utilized for configuring bus devices. For instance, if a system has PCI express capabilities, then the configuration space may be part of a CPU global address pool. In the case of a system conforming to the conventional PCI specification, the configuration space is internal facilities of the PCI device and may be accessed through two 32 bit I/O registers (0xCF8 used as an INDEX register; 0xCFC—DATA register).

As discussed briefly above, allocating memory address resources for a bus with only root bus devices in an efficient manner is a relatively straightforward task. Each bus device makes requests for PCI I/O and PCI memory address space resources that are powers of two. The requested values are also alignment requirements for the bus device's address decoder. Since all of the resource requests are powers of two, the resource requests are naturally aligned and can therefore be allocated without the need to pad the resource requests with unused memory addresses ("padding") to align the resource requests.

When one or more bridge devices are present on a bus (PCI-to-PCI bridges, for instance), however, the task of allocating memory address resources to the devices on the bus in an efficient manner becomes much more complex. This is primarily because bridges typically have only one set of registers for storing the address range to be decoded meanwhile could have more than one device on secondary interface, and therefore memory address resource requests for all of the bus devices on the secondary interface of a bridge must be grouped and allocated as a single continuous memory region. The memory address resource requirements for a bridge may, therefore, not be a power of two. Moreover, the bottom of the bridge decoding window must be aligned at the biggest alignment among resources behind the bridge, and the top might have the smallest alignment. As a result, it can be extremely difficult to efficiently allocate memory address resources when one or more bridges are present on a bus. It should also be appreciated that the As will be discussed in greater detail below with respect to FIGS. 3-11, the embodiments presented herein provide mechanisms for the efficient allocation of memory address resources to bus devices. In particular, through an implementation of the concepts and technologies presented herein, the amount of padding required when allocating memory address resources to bus devices can be reduced compared to some previous solutions. As a result, the amount of memory address resources wasted during the configuration of bus devices can be reduced. Additional details regarding the mechanisms provided herein for allocating memory address resources will be provided below with respect to FIGS. 3-11.

Figure 3:
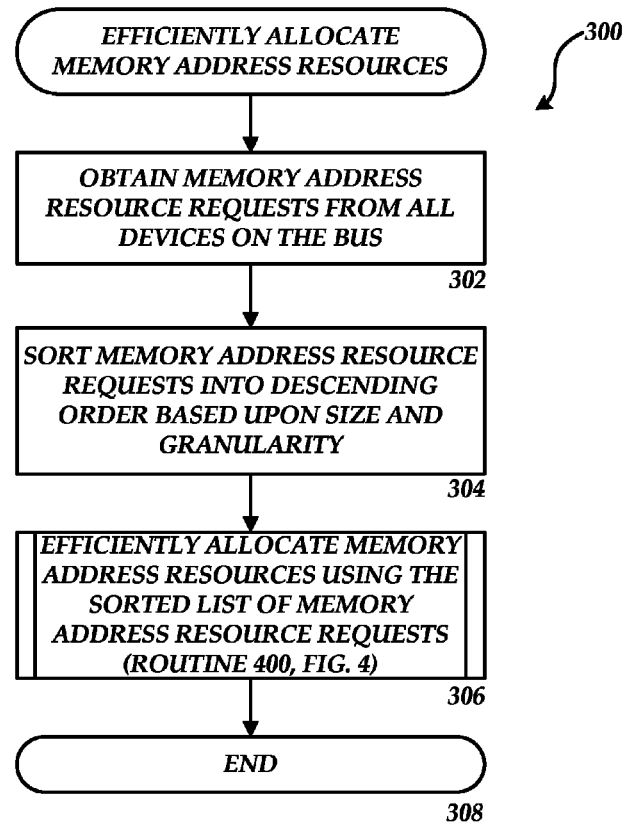
FIG. 3 is a flow diagram showing a high-level overview of one computer-implemented method for efficiently allocating memory address resources to bus devices in one embodiment presented herein.

FIG. 3 is a flow diagram showing a high-level overview of one computer-implemented method for efficiently allocating address space resources to bus devices in one embodiment presented herein. In particular, a routine 300 is shown in FIG. 3 that illustrates a computer-implemented method provided herein for efficiently allocating address space resources to bus devices. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 illustrated in FIG. 3 begins at operation 302, where memory address resource requests are obtained from the devices on the bus in a computing system. In an embodiment wherein a PCI bus system is utilized, each PCI device is queried to determine how much of the PCI memory address space 204 and the PCI I/O address space 206 that the device requires. In particular, all "1's" are written to the Base Address Register ("BAR") for each device. The contents of the BAR for each device are then read back. The device will return "0's" in the "don't-care" address bits, thereby specifying the required memory address resources.

Once the memory address resource requests have been obtained from the bus devices, the routine 300 proceeds to operation 304. At operation 304, the memory address resource requests are sorted into descending order (i.e. largest request first). In one implementation, the resource requests are sorted into descending order according to an address resource request size (i.e. the amount of address space required) and an alignment requirement (i.e. how the address space is to be aligned) associated with each memory address resource request.

Once the resource requests have been sorted into descending order, the routine 300 proceeds to operation 306, where the memory address resource requests are satisfied using the sorted resource requests. Details regarding how the memory address resource requests are allocated using the descended sorted memory address resource requests will be described in greater detail below. As the memory address resources are allocated to each device, the devices are programmed with the addresses of the allocated memory address resources. The bridges are also programmed with the addresses of the range of allocated memory address resources for devices behind the bridge. Once the devices and bridges have been programmed, the routine 300 proceeds to operation 308, where it ends.

Figure 4:
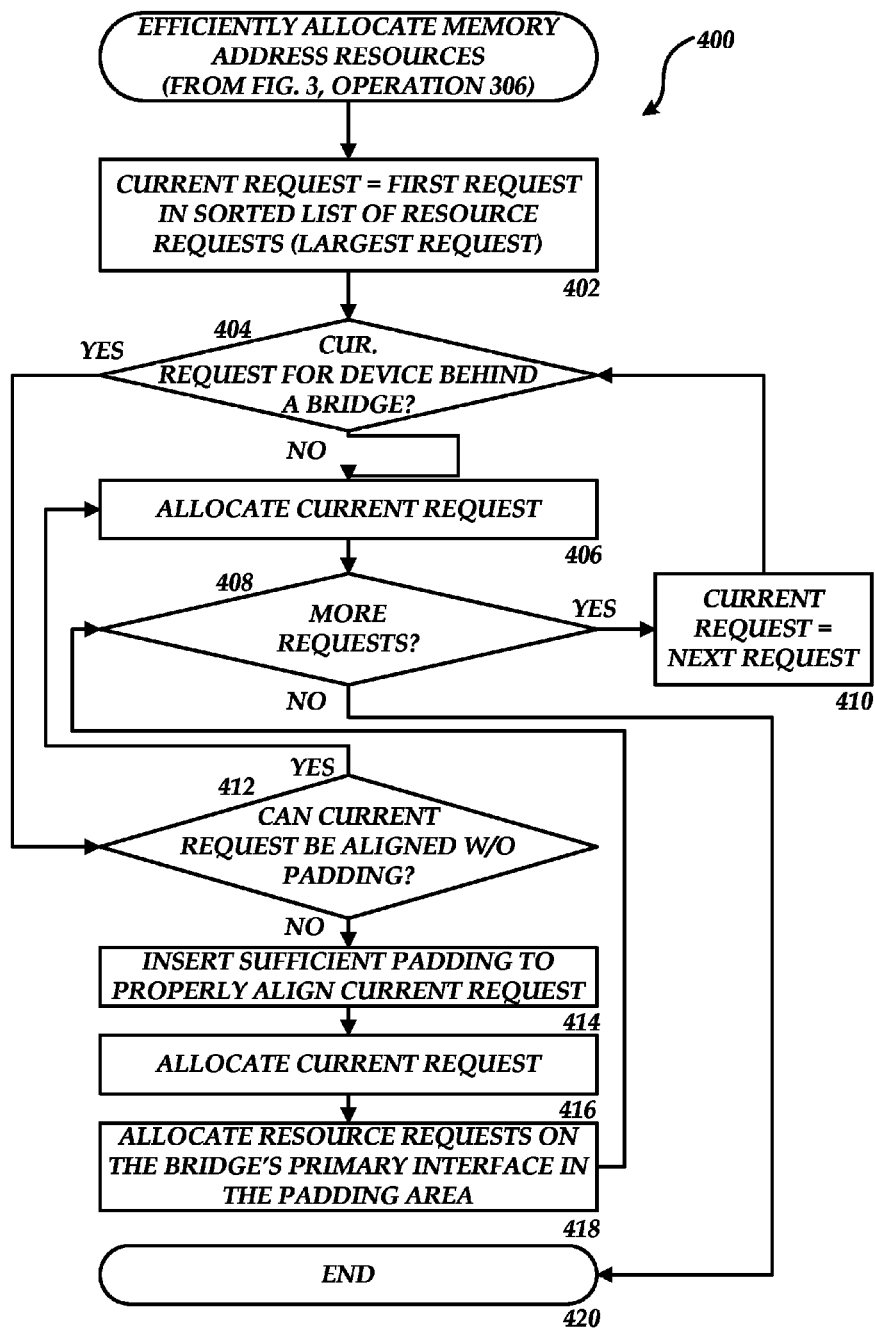
FIG. 4 is a flow diagram showing additional details regarding one method presented herein for efficiently allocating memory address resources to bus devices in one embodiment presented herein.

FIG. 4 is a flow diagram showing additional details regarding one method presented herein for efficiently allocating address space resources to bus devices in one embodiment presented herein. The routine 400 begins at operation 402, where a variable (the "current request" variable) utilized to keep track of the current resource request is set equal to the first memory address resource request (i.e. the largest request) of the descending sorted memory address resource requests.

From operation 402, the routine 400 proceeds to operation 404 where a determination is made as to whether the current request is for a device that is located "behind" a bridge. If the current request is for a device that is not located behind a bridge, the routine 400 proceeds from operation 404 to operation 406 where memory address resources are allocated to satisfy the current resource request.

Once the current resource request has been satisfied, the routine 400 proceeds to operation 408 where a determination is made as to whether more memory address resource requests remain to be satisfied. If not, the routine 400 proceeds from operation 408 to operation 420, where it ends. If more requests remain to be processed, the routine 400 proceeds from operation 408 to operation 410, where the current request variable is set equal to the next request of the descended sorted memory address resource requests (i.e. the next largest resource request). The routine 400 then proceeds from operation 410 to operation 404.

If, at operation 404, it is determined that the current request is for a device that is behind a bridge (i.e. connected to the bridge's secondary interface), the routine 400 proceeds from operation 404 to operation 412. At operation 412, a determination is made as to whether the current request can be aligned properly without inserting padding. If so, the routine 400 proceeds from operation 412 to operation 406, described above, where the current memory address resource request is allocated. If, however, the current request cannot be properly aligned without inserting padding, then the routine 400 proceeds from operation 412 to operation 414.

At operation 414, sufficient padding is allocated to properly align the current resource request. For instance, in one embodiment, an amount of padding is allocated that is necessary to properly satisfy the alignment requirement for the next resource request to be allocated. In this manner, the amount of padding necessary can be reduced as compared to previous solutions From operation 416, the routine 400 proceeds to operation 418, where memory address resource requests for devices located on the primary interface of the bridge device (the bridge that the current device is behind) are allocated from within the area of padding. This further reduces the amount of padding necessary as compared to previous solutions. From operation 418, the routine 400 proceeds to operation 408, described above, where additional memory address resource requests are processed in a similar manner as discussed above. The routine 400 shown in FIG. 4 will be described in the context of two exemplary bus configurations below with reference to FIGS. 5-7 and FIGS. 8-10, respectively.

Figure 5:
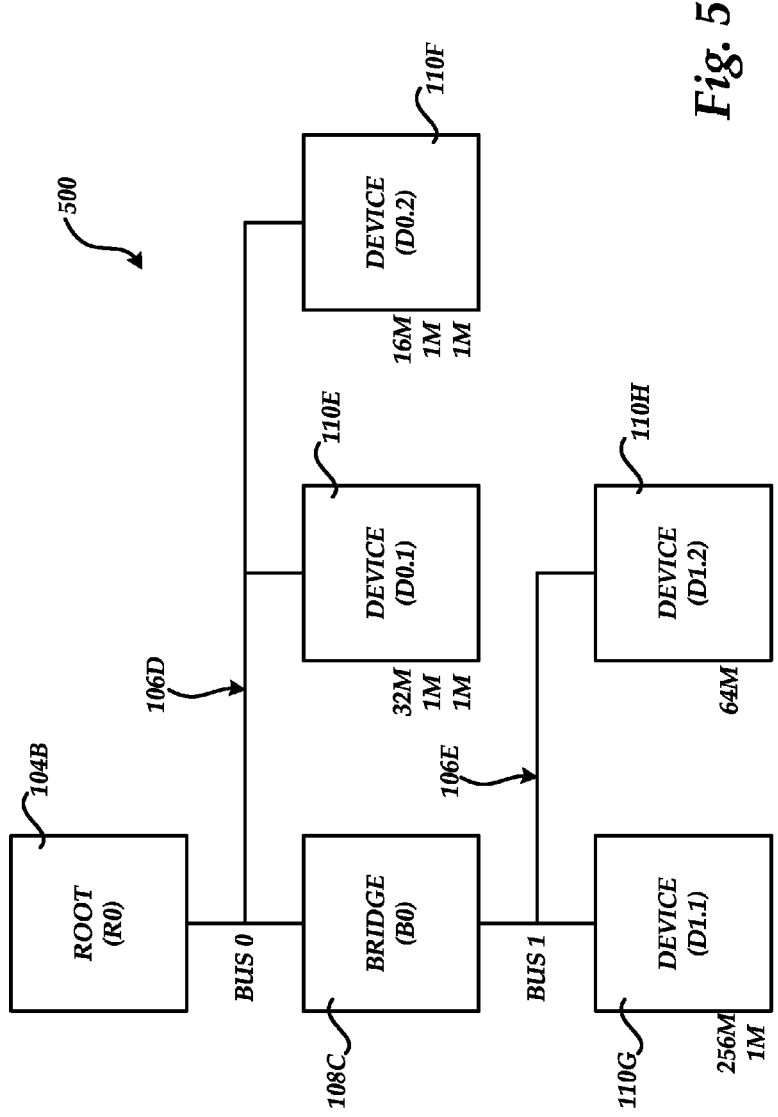
FIG. 5 is a bus diagram showing an illustrative bus and the memory address resource requirements for each device on the bus in one illustrative example presented herein.

FIG. 5 is a bus diagram showing an illustrative bus configuration 500 and the memory address resource requirements for each bus device in one illustrative example presented herein. In particular, the bus configuration 500 shown in FIG. 5 includes a host bridge 104B that provides a bus 106D and a bridge 108C that provides a second bus 106E. The bus 106D has the devices 110E and 110F thereupon and the bus 106E has the devices 110G and 110H thereupon.

In the illustrative bus configuration 500 shown in FIG. 5, the device 110E is requesting 32 megabytes ("M") of PCI memory address space 204, 1M of PCI I/O address space 206, and another 1M of PCI I/O address space 206. The device 110F is requesting 16M of PCI memory address space 204, 1M of PCI I/O address space 206, and another 1M of PCI I/O address space 206. The device 110G is requesting 256M of PCI memory address space 204 and 1M of PCI I/O address space 206. The device 110H is requesting 64M of PCI memory address space 204. In total, therefore, the devices behind the bridge 108C are requesting 321M of memory address resources.

Figure 6:
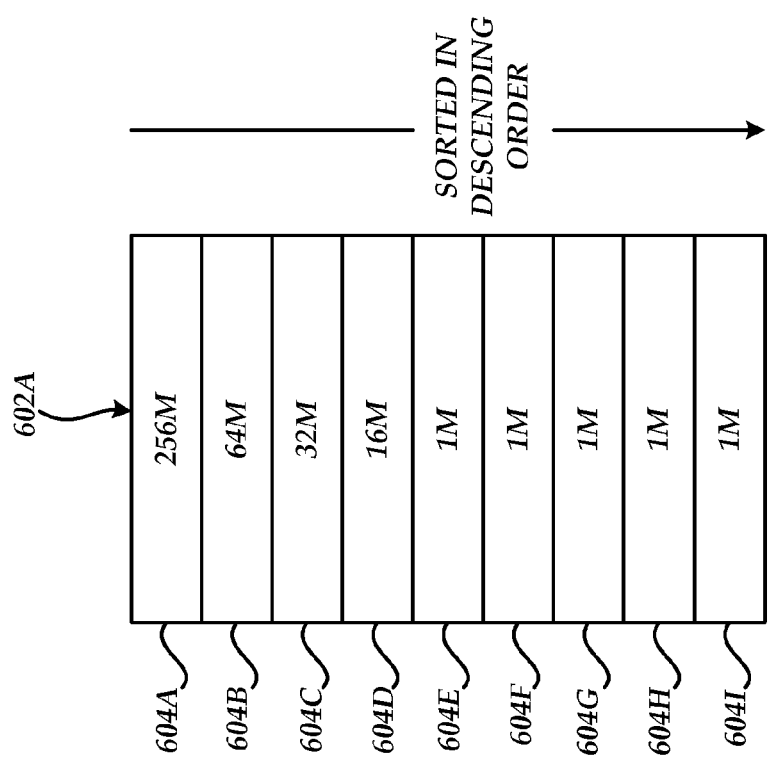
FIG. 6 is a data structure diagram showing a sorted list of memory address resource requirements for the devices illustrated in FIG. 5.

FIG. 6 is a data structure diagram showing a sorted list 602A of memory address space resources requested by the devices 110E, 110F, 110G, and 110H illustrated in FIG. 5. As shown in FIG. 6, the list 602E includes entries 604A-604I corresponding to the memory address resource request made by the devices 110E, 110F, 110G, and 110H. As discussed above with reference to FIG. 3, the entries 604A-604I are sorted into descending order. The sorted list 602A is then utilized in order to allocate the requested resources to the devices 110E, 110F, 110G, and 110H.

Figure 7:
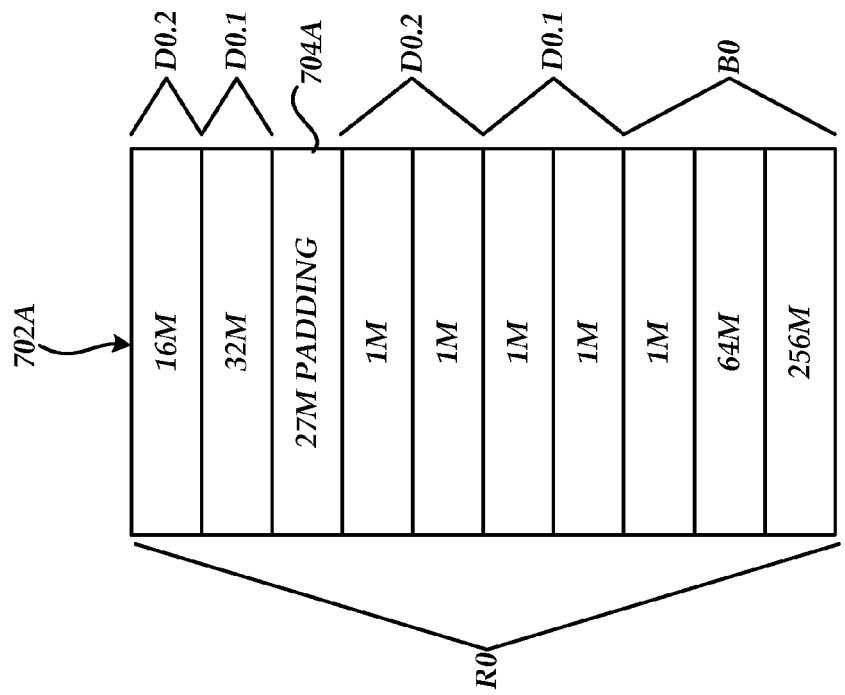
FIG. 7 is a memory map diagram showing an assignment of memory address resources to the devices illustrated in FIG. 5 utilizing one mechanism presented herein for efficiently allocating memory address resources.

FIG. 7 is a memory map diagram showing an assignment of memory address resources to the devices 110E, 110F, 110G, and 110H illustrated in FIG. 5 utilizing one mechanism presented herein for efficiently allocating memory address resources. In particular, the memory map 702A shows how the memory address resources requested by the devices 110E, 110F, 110G, and 110H of FIG. 5 have been allocated following the execution of the routine 400 described above with respect to FIG. 4.

Taking the memory address resources requests from the list 602A in descending order, the 256M request from device 110G and the 64M request of device 110H are allocated first. The next request, the 32M request from the device 110E, cannot be satisfied while maintaining the required alignment requirement. As a result, 32M of padding are first inserted. Then, requests from devices on the primary interface of the bridge 108C are allocated in the padding area where possible. Consequently, the four 1M requests from the devices 110E and 110F are allocated from within the padding area. This results in only 27M of padding 704A. Previous solutions would have required considerably more padding. Once the padding has been allocated, the 32M request from the device 110E and the 16M request from the device 110F can be satisfied.

FIG. 8 is a bus diagram showing another illustrative bus configuration 800 and the memory address resource requirements for each bus device in one illustrative example presented herein. In particular, the bus configuration 800 shown in FIG. 8 includes a host bridge 104C that provides a bus 106F, a bridge 108D that provides a second bus 106G, and a bridge 108E that provides a bus 106H. The bus 106F has the devices 110I and 110J thereupon, the bus 106G has the devices 110K and 110L thereupon, and the bus 106H has the devices 110M and 110N thereupon.

In the illustrative bus configuration 800 shown in FIG. 8, the device 110I is requesting 32M of PCI memory address space 204, 1M of PCI I/O address space 206, and another 1M of PCI I/O address space 206. The device 110J is requesting 16M of PCI memory address space 204, 1M of PCI I/O address space 206, and another 1M of PCI I/O address space 206. The device 110K is requesting 256M of PCI memory address space 204 and 1M of PCI I/O address space 206. The device 110L is requesting 64M of PCI memory address space 204. The device 110M is requesting 64M of PCI memory address space 204 and 1M of PCI I/O address space 206. The device 110N is requesting 32M of PCI memory address space 204 and 1M of PCI I/O address space 206. In total, therefore, the devices behind the bridge 104C are requesting 52M of memory address resources, the devices behind the bridge 108D are requesting 419M of resources, and the devices behind the bridge 108E are requesting 98M of resources.

FIG. 9 is a data structure diagram showing a sorted list 602B of memory address space resources requested by the devices illustrated in FIG. 5. As shown in FIG. 9, the list 602B includes entries 604J-604V corresponding to the memory address resource request made by the devices 110I, 110J, 110K, 110L, 110M, and 110N. As discussed above with reference to FIG. 3, the entries 604J-604V are sorted into descending order. The sorted list 602B is then utilized in order to allocate the requested resources to the devices shown in FIG. 8.

FIG. 10 is a memory map diagram showing an assignment of memory address resources to the devices illustrated in FIG. 8 utilizing one mechanism presented herein for efficiently allocating memory address resources. In particular, the memory map 702B shows how the memory address resources requested by the devices 110I, 110J, 110K, 110L, 110M, and 110N of FIG. 8 have been allocated following the execution of the routine 400 described above with respect to FIG. 4.

Taking the memory address resources requests from the list 602B in descending order, the 256M request from device 110K, and the 64M request of device 110L, the 64M request of the device 110M, and the 32M request from the device 110N are allocated first. The next request, the 32M request from the device 110I, cannot be satisfied while maintaining the required alignment. As a result, 16M of padding are first inserted (i.e. enough padding to satisfy the alignment requirement of the next resource request). Then, the 1M requests from the devices 110M and 110N are allocated along with requests from devices on the primary interface of the bridge 108D are allocated in the padding area where possible. Consequently, the 1M request from the device 110K and the four 1M requests from the devices 110I and 110J are allocated from within the padding area. This results in only 11M of padding 704B. Previous solutions would have required considerably more padding. Once the padding has been allocated, the 32M request from the device 110I and the 16M request from the device 110J can be satisfied.

Figure 11:
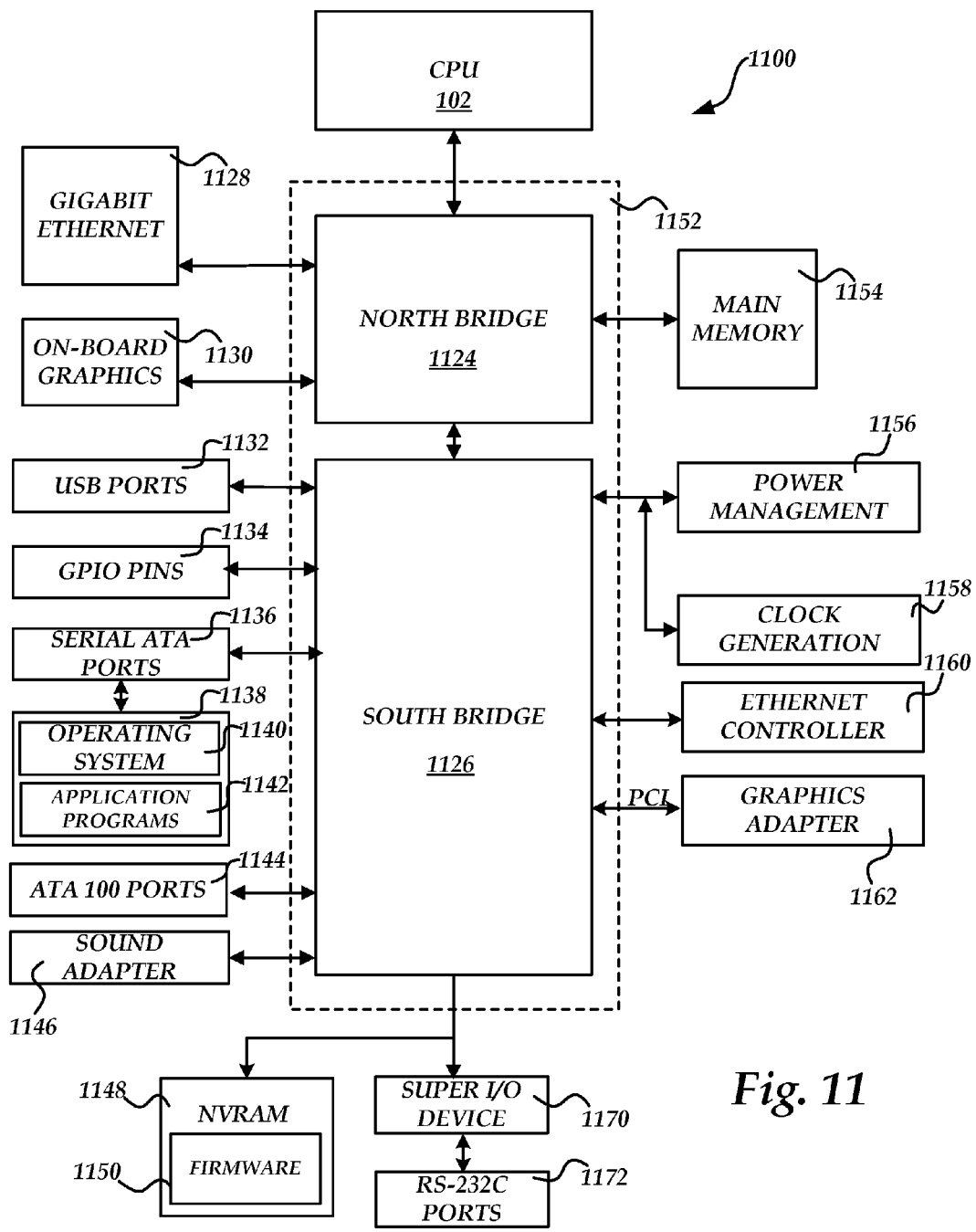
FIG. 11 is a computer architecture diagram showing an illustrative computer architecture that might be utilized to implement a computing system that embodies the various concepts and technologies presented herein.

FIG. 11 is a computer architecture diagram showing an illustrative computer architecture that might be utilized to implement the embodiments presented herein. FIG. 11 and the following discussion are intended to provide a brief, general description of one suitable computing environment in which the embodiments described herein may be implemented. While the technical details are presented herein in the general context of program modules that execute in conjunction with the execution of a firmware, those skilled in the art will recognize that the embodiments may also be implemented in combination with other program modules.

Generally, program modules include routines, programs, components, data structures, scripts, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

As discussed briefly above, FIG. 11 shows an illustrative computer architecture that may be utilized to embody a computing system that utilizes a firmware to embody the aspects described above for efficiently allocating address space resources to bus devices. The illustrative computer architecture shown in FIG. 11 is for a computer 1100 that includes a baseboard, or "motherboard", which is a printed circuit board to which a multitude of components or devices may be connected by way of a system bus or other electrical communication path. In one illustrative embodiment, a CPU 102 operates in conjunction with a chipset 1152. As discussed briefly above with regard to FIG. 1, the CPU 102 is a central processor that performs arithmetic and logical operations necessary for the operation of the computer. The computer 1100 may include a multitude of CPUs 102. The CPU 102 might include multiple processing cores.

The chipset 1152 includes a north bridge 1124 and a south bridge 1126. The north bridge 1124 provides an interface between the CPU 102 and the remainder of the computer 1100. The north bridge 1124 also provides an interface to a random access memory ("RAM") used as the main memory 1154 in the computer 1100 and, possibly, to an on-board graphics adapter 1130. The north bridge 1124 may also include functionality for providing networking functionality through a gigabit Ethernet adapter 1128. The gigabit Ethernet adapter 1128 is capable of connecting the computer 1100 to another computer via a network. Connections that may be made by the network adapter 1128 may include LAN or WAN connections. LAN and WAN networking environments are commonplace in offices, enterprise-wide computer networks, intranets, and the Internet. The north bridge 1124 is connected to the south bridge 1126.

The south bridge 1126 is responsible for controlling many of the input/output functions of the computer 1100. In particular, the south bridge 1126 may provide one or more universal serial bus ("USB") ports 1132, a sound adapter 1146, an Ethernet controller 1160, and one or more general-purpose input/output ("GPIO") pins 1134. The south bridge 1126 may also provide a bus for interfacing peripheral card devices such as a graphics adapter 1162. In one embodiment, the bus comprises a PCI bus having various devices thereupon as discussed above.

The south bridge 1126 is also configured to provide one or more interfaces for connecting mass storage devices to the computer 1100. For instance, according to an embodiment, the south bridge 1126 includes a serial advanced technology attachment ("SATA") adapter for providing one or more serial ATA ports 1136 and an ATA 100 adapter for providing one or more ATA 100 ports 1144. The serial ATA ports 1136 and the ATA 100 ports 1144 may be, in turn, connected to one or more mass storage devices storing an operating system 1140 and application programs 1142, such as the SATA disk drive 1138. As known to those skilled in the art, an operating system 1140 comprises a set of programs that control operations of a computer and allocation of resources. An application program is software that runs on top of the operating system software, or other runtime environment, and uses computer resources to perform application specific tasks desired by the user.

The mass storage devices connected to the south bridge 1126, and their associated computer-readable media, provide non-volatile storage for the computer 1100. Although the description of computer-readable media contained herein refers to a mass storage device, such as a hard disk or CD-ROM drive, it should be appreciated by those skilled in the art that computer-readable media can be any available media that can be accessed by the computer 1100. By way of example, and not limitation, computer-readable media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 1100.

A low pin count ("LPC") interface may also be provided by the south bridge 1126 for connecting a "Super I/O" device 1170. The Super I/O device 1170 is responsible for providing a number of input/output ports, including a keyboard port, a mouse port, a serial interface 1172, a parallel port, and other types of input/output ports. The LPC interface may also connect a computer-readable media such as a ROM or a flash memory such as the NVRAM 1148 for storing a firmware 1150 that includes program code containing the basic routines that help to start up the computer 1100 and for performing the functionality described above for efficiently allocating memory address space resources to bus devices.

It should be appreciated that the software components described herein may, when loaded into the CPU 102 and executed, transform the CPU 102 and the overall computer 1100 from a general-purpose computing system into a special-purpose computing system customized to facilitate the functionality presented herein. The CPU 102 may be constructed from any number of transistors or other discrete circuit elements, which may individually or collectively assume any number of states. More specifically, the CPU 102 may operate as a finite-state machine, in response to executable instructions contained within the software modules disclosed herein. These computer-executable instructions may transform the CPU 102 by specifying how the CPU 102 transitions between states, thereby transforming the transistors or other discrete hardware elements constituting the CPU 102.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1100 in order to store and execute the software components presented herein. It also should be appreciated that the computer 1100 may comprise other types of computing devices, including hand-held computers, embedded computer systems, personal digital assistants, and other types of computing devices known to those skilled in the art. It is also contemplated that the computer 1100 may not include all of the components shown in FIG. 11, may include other components that are not explicitly shown in FIG. 11, or may utilize an architecture completely different than that shown in FIG. 11.

Based on the foregoing, it should be appreciated that concepts and technologies for efficiently allocating address space resource requests to bus devices have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for allocating memory address resources to a plurality of devices on a bus, the method comprising performing computer-implemented operations for:
    obtaining memory address resource requests from the plurality of devices on the bus;
    sorting the memory address resource requests into descending order according to an address resource request size; and
    allocating the memory address resources to the devices according to the descending order of the sorted memory address resource requests.

2. The computer-implemented method of claim 1, wherein the memory address resource requests comprise at least one of (a) requests for Peripheral Component Interconnect (PCI) memory address space resources and (b) requests for PCI input/output (I/O) address space resources.

3. The computer-implemented method of claim 2, wherein sorting the memory address resource requests in descending order further comprises sorting the memory address resource requests in descending order according to an alignment requirement associated with each memory address resource request.

4. The computer-implemented method of claim 3, wherein allocating the memory address resources to the devices according to the descending order of the sorted memory address resource requests comprises:
    for each memory address resource request, allocating the requested memory address resource if the device making the memory address resource request is not behind a bridge device and, if the device making the memory address resource request is behind a bridge device, allocating the requested memory address resource if the memory address resource request can be satisfied without requiring the insertion of padding.

5. The computer-implemented method of claim 4, further comprising in response to determining that the device making the memory address resource request is behind a bridge device and that the memory address resource request cannot be satisfied without requiring the insertion of padding:
    allocating sufficient padding to properly align the memory address resource request;
    allocating the requested memory address resource; and
    satisfying memory address resource requests for devices on a primary interface of the bridge device within an area defined by the padding.

6. The computer-implemented method of claim 5, wherein the padding comprises unused memory addresses.

7. The computer-implemented method of claim 6, wherein allocating sufficient padding to properly align the memory address resource request comprises allocating an amount of padding necessary to properly satisfy the alignment requirement of a next memory resource request of the sorted memory address resource requests.

8. The computer-implemented method of claim 3, wherein sorting the memory address resource requests in descending order comprises sorting the memory address resource requests in descending order according to a sort key generated from the address resource request size and the alignment requirement.

9. A non-transitory computer-readable storage medium having computer-executable instructions stored thereupon which, when executed by a computer, cause the computer to:
    obtain memory address resource requests from a plurality of devices on a bus;
    sort the memory address resource requests into descending order according to a memory address resource request size; and
    allocate the requested memory address resources to the devices according to the descending order of the sorted memory address resource requests.

10. The non-transitory computer-readable storage medium of claim 9, wherein sorting the memory address resources requests in descending order further comprises sorting the memory address resource requests in descending order according to an alignment requirement associated with each memory address resource request.

11. The non-transitory computer-readable storage medium of claim 10, wherein allocating the memory address resource requests to the devices according to the descending order of the sorted memory address resource requests comprises:
for each memory address resource request, allocating the requested memory address resource if the device making the memory address resource request is not behind a bridge device and, if the device making the memory address resource request is behind a bridge device, allocating the requested memory address resource if the memory address resource request can be allocated without requiring the insertion of padding.

12. The non-transitory computer-readable storage medium of claim 11, having further computer-executable instructions stored thereupon which, when executed by the computer, cause the computer in response to determining that the device making the memory address resource request is behind a bridge device and that the requested memory address resource cannot be allocated without requiring the insertion of padding to:
allocate sufficient padding to properly align the memory address resource request;
allocate the requested memory address resource; and
allocate memory address resource requests for devices on a primary interface of the bridge device within an area defined by the padding.

13. The non-transitory computer-readable storage medium of claim 12, wherein the memory address resource requests comprise requests for Peripheral Component Interconnect (PCI) memory address space resources and PCI input/output (I/O) address space resources.

14. The non-transitory computer-readable storage medium of claim 13, wherein allocating sufficient padding to properly align the memory address request comprises allocating an amount of padding necessary to properly satisfy the alignment requirement of a next memory resource request of the sorted memory address resource requests.

15. A computing system comprising:
a central processing unit (CPU);
a random access memory (RAM) accessible by the CPU;
a bus connected to the CPU having one or more devices thereupon; and
a non-volatile memory having a firmware executable by the CPU stored therein, the firmware configured to allocate memory address resources to the devices on the bus by obtaining memory address resource requests from the devices on the bus, sorting the memory address resource requests into descending order according to a memory address resource request size, and allocating the memory address resources to the devices according to the descending order of the sorted memory address resource requests.

16. The computing system of claim 15, wherein sorting the memory address resource requests in descending order further comprises sorting the memory address resource requests in descending order according to an alignment requirement associated with each memory address resource request.

17. The computing system of claim 16, wherein allocating the memory address resource requests to the devices according to the descending order of the sorted memory address resource requests comprises:
for each memory address resource request, allocating the requested memory address resource if the device making the memory address resource request is not behind a bridge device and, if the device making the memory address resource request is behind a bridge device, allocating the requested memory address resource if the memory address resource request can be allocated without requiring the insertion of padding.

18. The computing system of claim 17, wherein the firmware is further configured in response to determining that the device making the memory address resource request is behind a bridge device and that the memory address resource request cannot be allocated without requiring the insertion of padding to:
allocate sufficient padding to properly align the memory address resource request;
allocate the memory address resource request; and
allocate requested memory address resources for devices on a primary interface of the bridge device within an area defined by the padding.

19. The computing system of claim 18, wherein allocating sufficient padding to properly align the memory address request comprises allocating an amount of padding necessary to properly satisfy the alignment requirement of a next memory resource request of the sorted memory address resource requests.

20. The computing system of claim 19, wherein the memory address resources comprise Peripheral Component Interconnect (PCI) memory address space resources and PCI input/output (I/O) address space resources.

* * * * *